United States Patent Office 3,054,808
Patented Sept. 18, 1962

3,054,808
3-ALKOXY-17α-ALKYNYL-16,16-DIFLUORO-ESTRA-1,3,5(10)-TRIEN-17β-OLS
Arthur H. Goldkamp, Glencoe, Ill., assignor to G. D. Searle & Co., Chicago, Ill., a corporation of Delaware
No Drawing. Filed Oct. 3, 1960, Ser. No. 59,791
2 Claims. (Cl. 260—397.5)

The present invention is concerned with novel 16,16-difluorinated steroids and, more particularly, with 3-alkoxy - 17α-alkynyl 16,16-difluoroestra-1,3,5(10)-trien-17β-ols of the structural formula

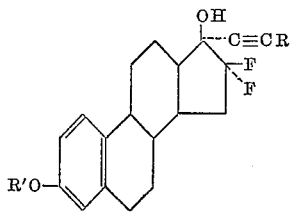

wherein R is hydrogen or a lower alkyl radical and R' is a lower alkyl radical.

Lower alkyl radicals encompassed by R and R' are, typically, methyl, ethyl, propyl, butyl, pentyl, hexyl, and the branched-chain isomers thereof.

The instant compounds can be manufactured by treating the appropriate 3 - alkoxy - 16,16 - difluoroestra-1,3,5,(10)-trien-17-one (prepared by the difluorination of the corresponding 3-alkoxyestra-1,3,5(10-trien-17-one according to the procedure described in my copending application, Serial No. 843,058, filed September 29, 1959, of which the present application is a continuation-in-part) with a lower 1-alkyne, for example in liquid ammonia in the presence of lithium amide. Alternatively, the 17-ketone can be condensed with the appropriate alkynyl lithium reagent. A third method involves the addition of the alkynyl magnesium halide to the appropriate 17-ketone under the conditions of the Grignard reaction. A procedure particularly suitable for the manufacture of the compounds in which R in the structural representation supra is a lower alkyl radical, involves the conversion of a 17α-ethynyl-17β-ol of this invention to its Grignard derivative, then alkylation of the latter substance with the appropriate alkyl halide.

The compounds of this invention are useful as intermediates in the manufacture of the corresponding 17α-alkyl derivatives, which may be obtained by catalytic hydrogenation of these intermediates. The instant compounds are useful also in view of their valuable pharmacological properties, particularly as exemplified by their ability to reduce the serum concentration of cholesterol and the corresponding cholesterol/phospholipid ratio without at the same time producing the potent feminizing side effects characteristic of known estrogens adapted to the regulation of cholesterol metabolism.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in in the art. In these examples temperatures are given in degrees centigrade (° C.). Quantities of materials are expressed in parts by weight unless otherwise noted.

EXAMPLE 1

To a mixture of 0.1 part of ferric nitrate monohydrate and 2,000 parts of liquid ammonia is added, portionwise, 11 parts of lithium. When the blue color has disappeared, acetylene is bubbled through the mixture for about 45 minutes. To this suspension is then added 3.2 parts of 16,16-difluoro-3-methoxyestra-1,3,5(10)-trien-17-one, and the resulting mixture is stirred for about 5 hours. The ammonia is then allowed to evaporate, and the residue is treated successively with ether and saturated aqueous ammonium chloride. The organic layer is separated, washed with water, dried over anhydrous sodium sulfate, and concentrated to dryness in vacuo. The resulting residue is adsorbed on silica gel, eluted with 80% benzene in hexane, and recrystallized from hexane, to afford pure 17α - ethynyl - 16,16-difluoro-3-methoxyestra-1,3,5(10)-trien-17β-ol, M.P. 95–98°; $[\alpha]_D = +26°$ (chloroform).

EXAMPLE 2

To a mixture of 4.3 parts of lithium wire and 70 parts of ether, under nitrogen, is added dropwise over a period of about 30 minutes, a solution of 34.25 parts of n-butyl bromide in 35 parts of ether while the temperature is kept at −10°. This reaction mixture is stirred at 0–10° for about one hour, then filtered under nitrogen to afford 154 parts by volume of an ethereal solution of butyl lithium.

A mixture of 51 parts by volume of the aforementioned ethereal butyl lithium solution with 35 parts of ether is cooled to −10°, then treated dropwise, over a period of about 30 minutes, with a solution of 6 parts of butyne-1 in 35 parts of ether. The resulting mixture is stirred at 0° for about 1½ hours. The cooling bath is removed, and there is then added dropwise to this mixture a solution of 12.6 parts of 3-n-butoxy-16,16-difluoroestra-1,3,5(10)-trien-17-one in 100 parts of tetrahydrofuran. After the addition is complete, the solvent is distilled, keeping the volume constant by the addition of tetrahydrofuran. When the temperature of the distillate reaches 55°, the distillation is stopped, and the mixture is heated at reflux for about 3 hours, then cooled, and poured slowly into ice water. The oily product which forms is separated by decantation, then dissolved in ether. The ethereal solution is washed successively with water and saturated aqueous sodium chloride, dried over anhydrous sodium sulfate, and concentrated in vacuo to afford 3 - n - butoxy - 17α-butynyl - 16,16 - difluoroestra-1,3,5(10)-trien-17β-ol.

What is claimed is:
1. A compound of the structural formula

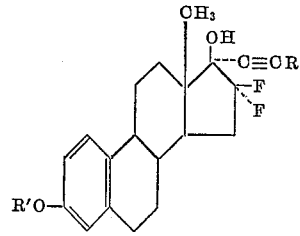

wherein R is selected from the group consisting of hydrogen and lower alkyl radical and R' is a lower alkyl radical.

2. 17α-ethynyl-16,16-difluoro-3-methoxyestra-1,3,5(10)-trien-17β-ol.

No references cited.